United States Patent
Isezaki et al.

(10) Patent No.: US 12,026,632 B2
(45) Date of Patent: Jul. 2, 2024

(54) RESPONSE PHRASE SELECTION DEVICE AND METHOD

(71) Applicant: NIPPON TELEGRAPH AND TELEPHONE CORPORATION, Tokyo (JP)

(72) Inventors: Takashi Isezaki, Musashino (JP); Tomohiro Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 805 days.

(21) Appl. No.: 17/255,496

(22) PCT Filed: Jun. 25, 2019

(86) PCT No.: PCT/JP2019/025197
§ 371 (c)(1),
(2) Date: Dec. 23, 2020

(87) PCT Pub. No.: WO2020/004401
PCT Pub. Date: Jan. 2, 2020

(65) Prior Publication Data
US 2021/0271990 A1    Sep. 2, 2021

(30) Foreign Application Priority Data
Jun. 29, 2018  (JP) ................. 2018-124735

(51) Int. Cl.
G06N 5/04 (2023.01)
(52) U.S. Cl.
CPC .................... G06N 5/04 (2013.01)

(58) Field of Classification Search
None
See application file for complete search history.

(56) References Cited

U.S. PATENT DOCUMENTS

| 5,519,608 A * | 5/1996 | Kupiec | ............... G06F 16/3344 704/9 |
| 8,024,332 B2 * | 9/2011 | Cao | ........................ G06F 16/338 707/728 |

(Continued)

FOREIGN PATENT DOCUMENTS

| JP | 2007102104 A | 4/2007 |
| JP | 201579383 A | 4/2015 |

*Primary Examiner* — Maikhanh Nguyen
(74) *Attorney, Agent, or Firm* — Harness, Dickey & Pierce, P.L.C.

(57) ABSTRACT

A theme phrase feature value calculation unit 103 calculates a feature value $F_q$ of a given theme phrase Q based on the cosine similarity with a feature keyword of a feature keyword DB 107b. A positive/negative example determination unit 104 applies the feature value $F_q$ to a positive/negative example determination model to determine whether a response phrase A is a positive example or a negative example. A response phrase score calculation unit 105 calculates the cosine similarity between the theme phrase Q and a plurality of theme phrases that form a pair with a response phrase A determined to be a positive example, and the highest value of the calculated cosine similarity is set as a score of the response phrase A. A response phrase selection unit 106 selects the response phrase indicating the maximum score as the response phrase for the theme phrase Q.

10 Claims, 8 Drawing Sheets

(56) References Cited

U.S. PATENT DOCUMENTS

| | | | | |
|---|---|---|---|---|
| 9,063,975 | B2* | 6/2015 | Isensee | G06F 16/248 |
| 9,305,059 | B1* | 4/2016 | Glickman | G06F 16/2457 |
| 10,176,804 | B2* | 1/2019 | Jiang | G10L 25/51 |
| 2004/0167875 | A1* | 8/2004 | Sneiders | G06F 16/24522 |
| 2006/0078862 | A1* | 4/2006 | Goto | G09B 7/02 |
| | | | | 434/322 |
| 2007/0207449 | A1* | 9/2007 | Feierstein | G09B 7/02 |
| | | | | 434/323 |
| 2016/0098477 | A1* | 4/2016 | Berajawala | G06F 3/0482 |
| | | | | 707/727 |
| 2016/0098737 | A1* | 4/2016 | Berajawala | G06F 16/24578 |
| | | | | 705/7.32 |
| 2017/0372215 | A1* | 12/2017 | Platt | G06F 16/245 |
| 2018/0341871 | A1* | 11/2018 | Maitra | G06N 3/042 |
| 2019/0228069 | A1* | 7/2019 | Zhou | G06F 16/3329 |

\* cited by examiner

| FEATURE KEYWORD |
| --- |
| MAN |
| WOMAN |
| SENIOR |
| CHILDHOOD |
| YOUTH |
| MIDDLE AGED |
| OLD AGE |
| ... |
| LARGE |

Fig. 3

| FEATURE KEYWORD | KEYWORD VECTOR |
|---|---|
| MAN | $t_1$ |
| WOMAN | $t_2$ |
| SENIOR | $t_3$ |
| CHILDHOOD | $t_4$ |
| YOUTH | $t_5$ |
| MIDDLE AGED | $t_6$ |
| OLD AGE | $t_7$ |
| ... | ... |
| LARGE | $t_m$ |

Fig. 4

| THEME | RESPONSE |
|-------|----------|
| $Q_1$ | $A_1$ |
| $Q_1$ | $A_2$ |
| $Q_1$ | $A_3$ |
| $Q_1$ | $A_4$ |
| $Q_2$ | $A_1$ |
| $Q_2$ | $A_5$ |
| $Q_3$ | $A_3$ |
| ... | ... |

Fig. 5

| THEME | RESPONSE |
|-------|----------|
| $Q_1$ | $A_5$ |
| $Q_1$ | $A_6$ |
| $Q_1$ | $A_7$ |
| $Q_2$ | $A_2$ |
| $Q_2$ | $A_3$ |
| $Q_2$ | $A_4$ |
| $Q_3$ | $A_1$ |
| ... | ... |

| RESPONSE PHRASE | SCORE |
|---|---|
| $A_1$ | 0.8 |
| $A_2$ | 0.4 |
| $A_3$ | Nan |
| $A_4$ | Nan |
| $A_5$ | 0.74 |
| $A_6$ | 0.3 |
| $A_7$ | 0.4 |
| $A_8$ | Nan |
| ... | ... |

RESPONSE PHRASE SELECTION DEVICE AND METHOD

CROSS-REFERENCE TO RELATED APPLICATIONS

This application is a 371 U.S. National Phase of International Application No. PCT/JP2019/025197, filed on Jun. 25, 2019, which claims priority to Japanese Application No. 2018-124735 filed on Jun. 29, 2018. The entire disclosures of the above applications are incorporated herein by reference.

TECHNICAL FIELD

The present invention relates to a response phrase selection device, method, and program for, for example, selecting a response phrase for an input phrase.

BACKGROUND ART

Among performing arts called "talking arts", there are many fans of genres such as "nazokake" and "ogiri" that enjoy the clever use of words. In ogiri, returning a clever response for a theme such as "I don't like this sort of thing!" invites laughter of an audience, and is considered an art.

In recent years, computers have been used in all areas of society, and for example, voice translation services using tablets, the utilization of AI (Artificial Intelligence) speakers, and the like have become known. A key to this is technology for selecting an appropriate response phrase for an input phrase, and there have been attempts to utilize this technology in the field of entertainment. In other words, one use of such technology is to cause a computer to generate a response phrase for a theme.

As technology for selecting a response phrase for an input phrase, there is a system in which a predicate-argument structure database is created from large-scale text data, a record including a word indicating a conversation topic is selected from the predicate-argument structure database, and a response phrase is generated (see, for example, PTL 1). Regarding common Q & A, there is technology for selecting a response phrase by using the frequency at which a word included in a history of spoken phrases of a user is included in the response phrase as a score (for example, see PTL 2).

PRIOR ART

Patent Literature

[PTL 1] Japanese Patent Application Publication No. 2015-79383
[PTL 2] Japanese Patent Application Publication No. 2007-102104

SUMMARY OF THE INVENTION

Technical Problem

It is difficult to apply a technique using large-scale text data to ogiri. In common large-scale text data, response phrases having low co-occurrence with an ogiri theme phrase often become positive examples, so at least, construction of a predicate-argument structure database that causes laughter is difficult.

Also, in ogiri there are few time-series elements, unlike ordinary conversation. Therefore, it is difficult to appropriately select a response phrase using a technique of scoring based on the history of words of spoken phrases of a user and words of a theme phrase.

The present invention was made in consideration of the above circumstances, and in one aspect, aims to provide technology enabling selection of a response phrase appropriate for a theme phrase.

Means for Solving the Problem

In order to address the above problem, a first aspect of the present invention includes: positive/negative example determination means for, using a positive/negative example determination model of each response phrase constructed from a feature value of a theme Qi assigned a positive example or a negative example for each response phrase, performing a positive/negative example determination of a given theme phrase Q for each response phrase; response phrase score calculation means for calculating a response phrase score from a feature value of a theme Qi that is a positive example for a response phrase and a feature value of the theme phrase Q, for a response phrase determined to be a positive example by the positive/negative example determination means; and response phrase selection means for selecting a response phrase for the theme phrase Q based on the response phrase score.

Effects of the Invention

According to the first aspect of the present invention, the positive/negative example determination means, using a positive/negative example determination model of each response phrase constructed from a feature value of a theme Qi assigned a positive example or a negative example for each response phrase, performs a positive/negative example determination of a given theme phrase Q for each response phrase. Also, the response phrase score calculation means calculates a response phrase score from a feature value of a theme Qi that is a positive example for a response phrase and a feature value of the theme phrase Q, for a response phrase determined to be a positive example by the positive/negative example determination means. Also, the response phrase selection means selects a response phrase for the theme phrase Q based on the response phrase score. By adopting this sort of configuration, it is possible to select a response phrase appropriate for a theme phrase.

DESCRIPTION OF EMBODIMENTS

Hereinafter, an embodiment for carrying out the present invention will be described with reference to the figures. Below, technology will be described in which ogiri is adopted as a conversational art, and a response phrase to a theme phrase that causes laughter of an audience (user) is selected within the framework of ogiri.

One Embodiment

Configuration

Figure 1:
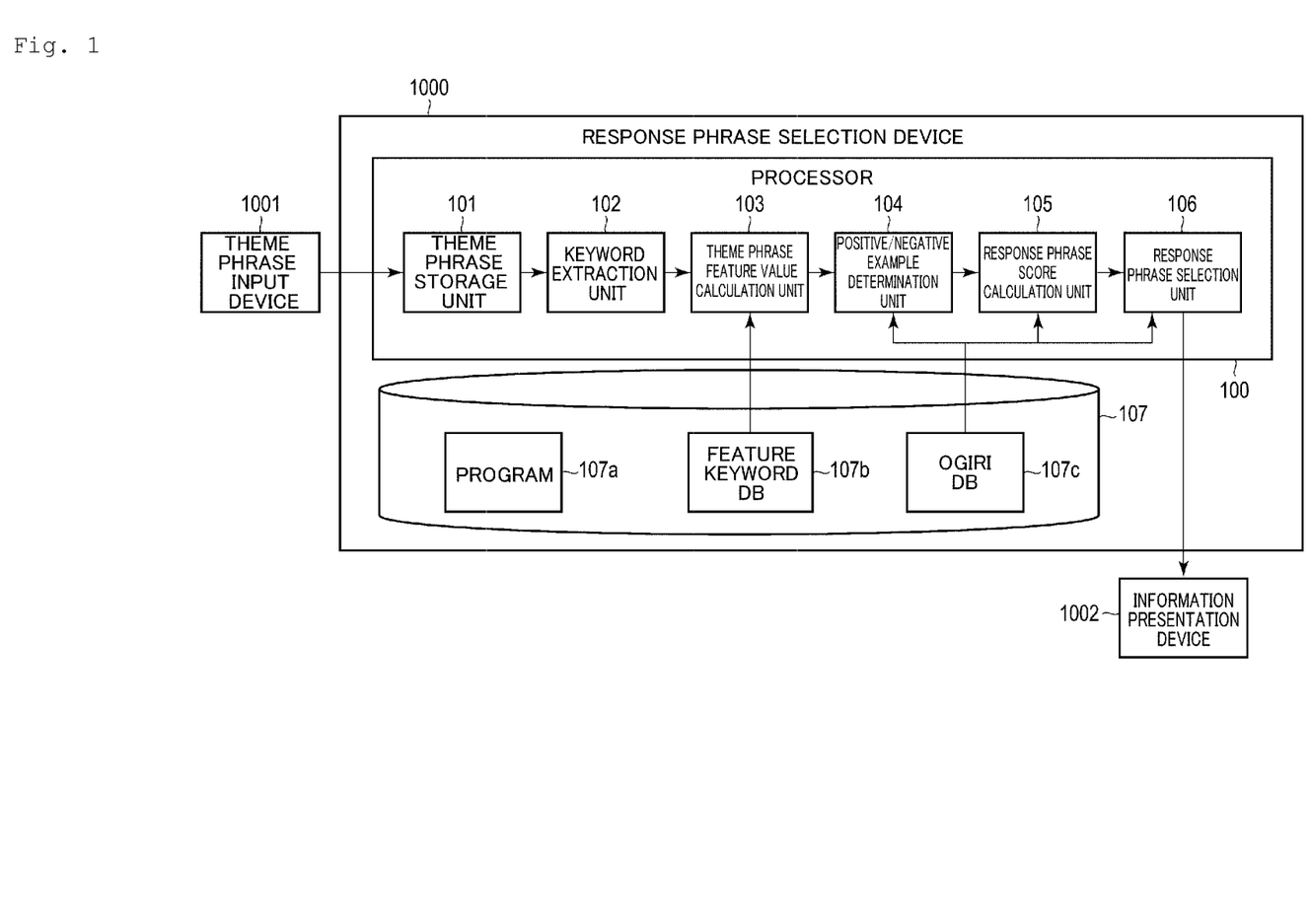
FIG. 1 is a functional block diagram showing an example of a response phrase selection device according to an embodiment.

FIG. 1 is a functional block diagram showing an example of a response phrase selection device according to an embodiment. In one embodiment, a response phrase selection device 1000 receives input of a theme phrase from a theme phrase input device 1001, creates a response phrase for this theme phrase, and outputs the created response phrase to an information presentation device 1002.

The theme phrase input device 1001 accepts a theme phrase given by a user and passes the theme phrase in text data format to the response phrase selection device 1000. The theme phrase input device 1001 is a human-machine interface device such as a personal computer or a smartphone, for example. It is assumed that a theme phrase is input to these devices in text format. Alternatively, the theme phrase may be given as voice to a voice recognition device such as an AI speaker, or a voice input device such as a microphone, and then recognized after conversion into text.

The information presentation device 1002 is assumed to be a display or the like that displays the response phrase as text. Alternatively, the response phrase may be converted into voice data and output as a loud voice from a speaker. If the theme phrase input device 1001 and the information presentation device 1002 are integrated, they can be enjoyed as a gadget that returns a response to a theme phrase.

The response phrase selection device 1000 is a computer, and includes a processor 100 and a storage unit 107 as hardware.

The processor 100 realizes functions according to this embodiment according to a program 107a stored in the storage unit 107.

The storage unit 107 is a semiconductor memory such as a ROM (Read Only Memory) or a RAM (Random Access Memory), or a storage medium such as an HDD (Hard Disk Drive) or an SSD (Solid State Drive). The storage unit 107 includes the program 107a for causing the processor 100 to function as the response phrase selection device 1000, a feature keyword database (DB) 107b that stores feature keywords, and an ogiri database (DB) 107c that stores a plurality of response phrases.

Incidentally, as processing functions according to this embodiment, the processor 100 is provided with a theme phrase storage unit 101, a keyword extraction unit 102, a theme phrase feature value calculation unit 103, a positive/negative example determination unit 104, a response phrase score calculation unit 105, and a response phrase selection unit 106. These functional blocks can be understood as processing generated in the course of loading the program 107a into the memory and executing the program.

The theme phrase storage unit 101 accepts and holds a theme phrase (denoted as a theme phrase Q) given from the theme phrase input device 1001, and outputs this theme phrase to the keyword extraction unit 102.

The keyword extraction unit 102 obtains a word group by dividing the theme phrase Q passed from the theme phrase storage unit 101 into word units by a known morphological analysis technology, for example. Further, the keyword extraction unit 102 removes predetermined words (excluded words) defined in advance from this word group to obtain a word group $[w_1, w_2, \ldots, w_n]$. The word length of the theme phrase Q excluding the excluded word group is represented by n. The word group $[w_1, w_2, \ldots, W_n]$ derived from the theme phrase Q is sent to the theme phrase feature value calculation unit 103.

The theme phrase feature value calculation unit 103 calculates a feature value $F_q$ of the theme phrase Q from the word group $[w_1, w_2, \ldots, w_n]$ passed from the keyword extraction unit 102. The word group $[w_1, w_2, \ldots, w_n]$ can be said to be an array in which each word of the theme phrase Q is converted to a vector. The theme phrase feature value calculation unit 103 calculates the feature value $F_q$ of the theme phrase Q using the array and the feature keyword DB 107b.

Figure 2:
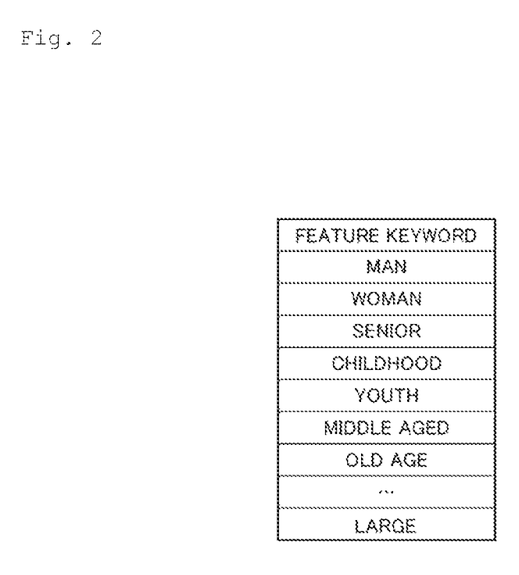
FIG. 2 shows an example of feature keywords stored in a feature keyword DB 107b.

FIG. 2 shows an example of feature keywords stored in the feature keyword DB 107b. The feature keywords as shown in FIG. 2 can be extracted in advance by a technique such as data mining from an existing database (for example, Wikipedia (registered trademark) or the like).

By applying an existing technique such as Word2Vec, it is possible to construct a word space in which the concept of a word can be expressed as a vector. Word2Vec is known as one technique of analyzing a large amount of text data and converting the meaning of each word into a vector expression. By applying Word2Vec to the feature keyword group of FIG. 2, each of the feature keywords of the elements of the feature keyword group can be represented by respective vector expressions.

Figure 3:
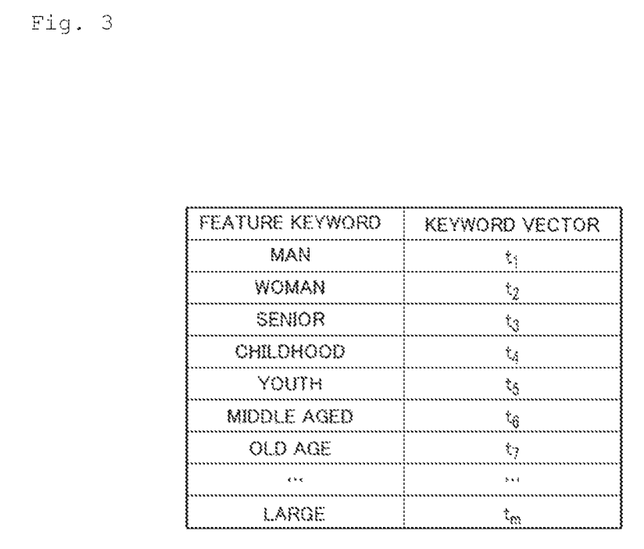
FIG. 3 shows an example of a keyword vector sequence associated with each feature keyword of FIG. 2.

FIG. 3 shows an example of a keyword vector sequence created by applying Word2Vec, for example, to the feature keyword group of FIG. 2. In FIG. 3, the letter m represents the number of feature keywords.

The similarity between words can be calculated, for example, from a cosine similarity. For example, the degree of similarity between vectors $w_1$ and $t_1$ is represented by $\cos(w_1, t_1)$, which is a scalar quantity. The theme phrase feature value calculation unit 103 calculates the cosine similarity between the array $[w_1, w_2, \ldots, w_n]$ and the keyword vectors $[t_1, t_2, \ldots, t_m]$. Then, the theme phrase feature value calculation unit 103, based on the highest similarity and the lowest similarity of each word of the theme phrase Q with respect to each feature keyword, calculates the feature value $F_q$ of the theme phrase Q using, for example, Formula 1.

[Formula 1]

$$\text{Feature Amount } F_q = \begin{bmatrix} \max_{i=1\sim n}(\cos(w_i, t_1)), \min_{i=1\sim n}(\cos(w_i, t_1)), \\ \max_{i=1\sim n}(\cos(w_i, t_2)), \min_{i=1\sim n}(\cos(w_i, t_2)), \\ \ldots, \\ \max_{i=1\sim n}(\cos(w_i, t_m)), \min_{i=1\sim n}(\cos(w_i, t_m)) \end{bmatrix} \quad (1)$$

On the right side of Formula 1, max represents the maximum value of the cosine similarity, and min represents the minimum value. Each element on the right side is the maximum value or minimum value of the cosine similarity with the keyword vectors $[t_1, t_2, \ldots, t_m]$ for all of the array $[w_1, w_2, \ldots, w_n]$. According to Formula 1, the feature value $F_q$ is a 2m-dimensional vector. The calculated feature value $F_q$ is sent to the positive/negative example determination unit 104.

The positive/negative example determination unit 104 uses the feature value $F_q$ of the theme phrase Q to determine whether the theme phrase Q is a positive example or a negative example, with respect to all of the response phrases stored in the ogiri DB 107*c*. In one embodiment, a positive example means that a pair of a theme phrase and a response phrase recalls laughter of the user, and a negative example means that a pair of a theme phrase and a response phrase does not recall laughter of the user.

A positive/negative example determination model constructed in advance can be used to distinguish between positive examples and negative examples. Here, the positive/negative example determination model can be constructed, for example, using a support vector machine or the like that is common in natural language analysis. Alternatively, other machine learning techniques or statistical techniques such as a k-nearest neighbor method may be used.

Figure 4:
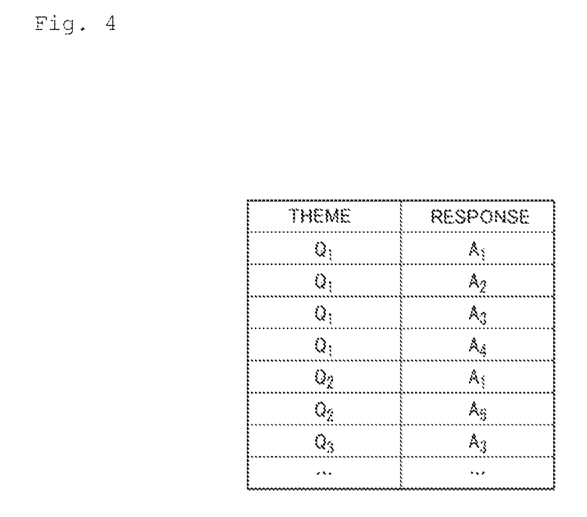
FIG. 4 shows an example of correspondences of a theme phrase and a response phrase that form a positive example pair.
Figure 5:
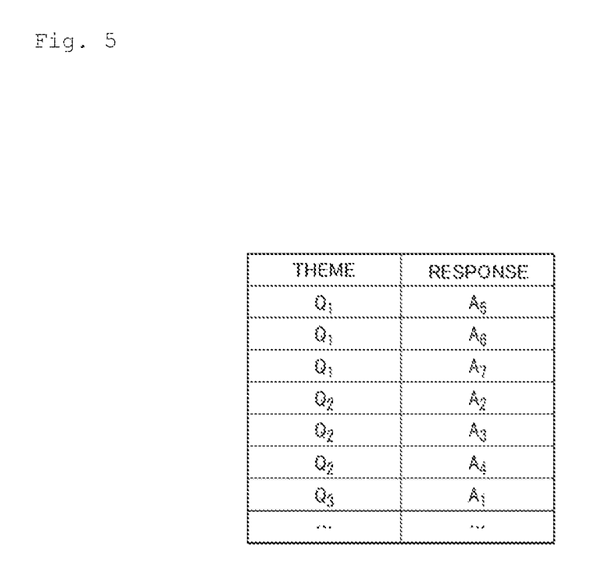
FIG. 5 shows an example of correspondences of a theme phrase and a response phrase that form a negative example pair.

FIGS. 4 and 5 show examples of content stored in the ogiri DB 107*c*. The ogiri DB 107*c* stores positive example pairs of theme phrases and response phrases (FIG. 4), and negative example pairs of theme phrases and response phrases (FIG. 5). In one embodiment, a positive example pair is a pair of a theme phrase and a response phrase that cause a user to laugh, and a negative example pair is a pair of a theme phrase and a response phrase that does not cause the user to laugh. For example, with respect to a theme phrase $Q_1$, referring to FIGS. 4 and 5, response phrases $A_1$, $A_2$, $A_3$, and $A_4$ form positive example pairs with the theme phrase $Q_1$, and response phrases $A_5$, $A_6$, and $A_7$ form negative example pairs with the theme phrase $Q_1$.

Since one response phrase is a response phrase that is satisfied with respect to a specific feature of the theme phrase, this exists as a positive example pair if other response phrases also have similar features. In other words, whether the response phrase is a positive example or a negative example depends on the specific features of the theme phrase.

In this embodiment, attention is paid to the fact that a theme phrase in ogiri and its response phrase are combined under a specific feature of the theme phrase. For example, suppose that there is a response phrase "it's tilted" for a theme phrase "I don't like this kind of table". These are combined under a feature that "the table is horizontal".

On the other hand, chairs, houses, and the like are also included as objects that include horizontal as a feature. Therefore, it can be said that the response phrase "it's tilted" should be combined as a positive example with theme phrases such as "I don't like this kind of chair" and "I don't like this kind of house".

The positive/negative example determination unit 104 inputs the feature value $F_q$ of theme phrase Q to the positive/negative example determination model. Then, if an output label is 1, a positive example determination is made, and if the output label is −1, a negative example determination is made, and the determination result is output to the response phrase score calculation unit 105.

The response phrase score calculation unit 105 acquires the positive/negative example determination results of the theme phrase Q for each response phrase in the ogiri DB 107*c* from the positive/negative example determination unit 104. Then, the response phrase score calculation unit 105 calculates a score indicating the degree of conformity with the theme phrase Q for each response phrase of the ogiri DB 107*c* based on the feature value $F_q$ of the theme phrase Q. The calculated score is passed to the response phrase selection unit 106.

The response phrase selection unit 106 selects a response phrase indicating the maximum score for the theme phrase Q based on the scores passed from the response phrase score calculation unit 105, and outputs this response phrase to the information presentation device 1002. The information presentation device 1002 presents the selected response phrase to the user in the form of text display, voice output, or the like. Next, operation of the above configuration will be described.

Operation

Figure 6:
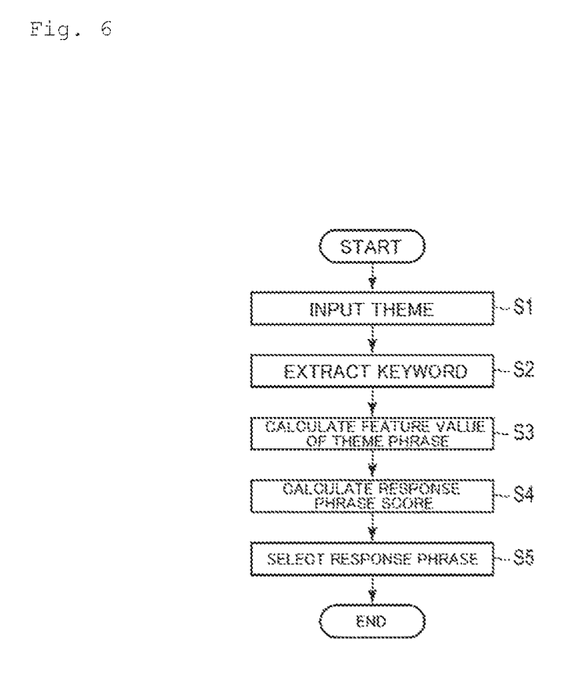
FIG. 6 is a flowchart showing an example of a processing procedure of a response phrase selection device 1000 according to one embodiment.

FIG. 6 is a flowchart showing an example of a processing procedure of the response phrase selection device 1000 according to one embodiment. In FIG. 6, when the theme phrase Q is given (step S1), the response phrase selection device 1000 divides the theme phrase Q into word units and extracts keywords of the theme phrase Q (step S2). Next, the response phrase selection device 1000 calculates the feature value $F_q$ of the theme phrase Q from the extracted keywords of the theme phrase Q (step S3).

Next, the response phrase selection device 1000 calculates the degree of similarity between the feature value $F_q$ of the theme phrase Q and the feature value of each theme phrase included in the ogiri DB 107*c*, and extracts a theme phrase having a high degree of similarity. Then, a score is calculated using the theme response suitability (positive example: +1, negative example: −1) of the response phrase combined with the extracted theme phrase (step S4).

Further, the response phrase selection device 1000 selects a response phrase for the theme phrase Q from the ogiri DB 107*c* based on the calculated score (step S5).

Figure 7:
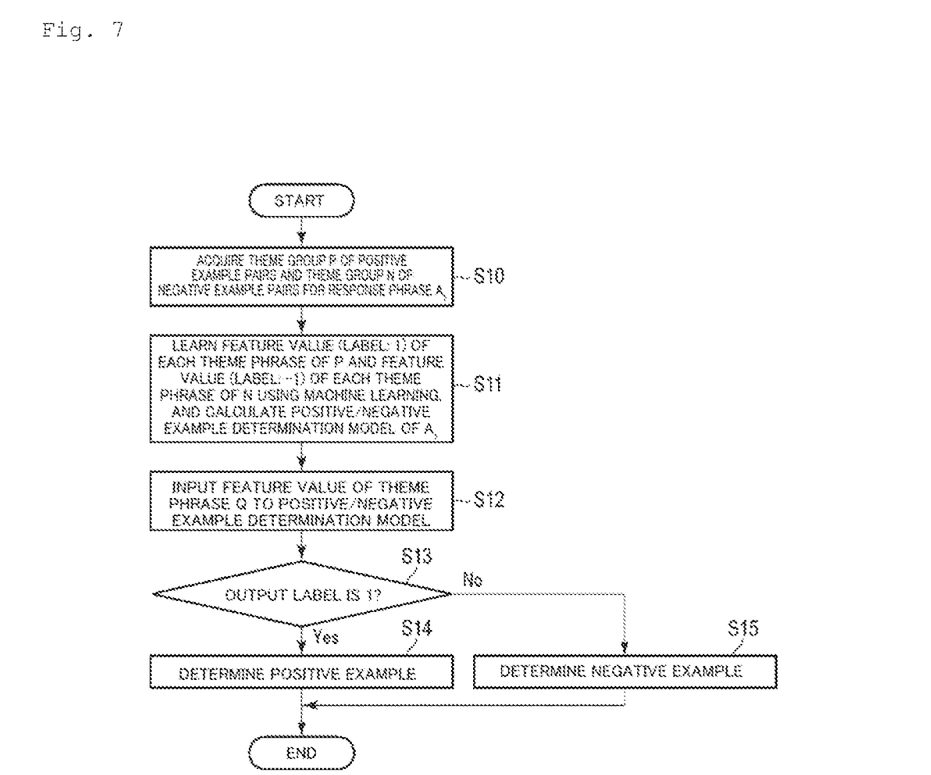
FIG. 7 is a flowchart for explaining positive/negative example determination and calculation of a score.

FIG. 7 is a flowchart for explaining positive/negative example determination and calculation of a score. Next is a description of an example of positive/negative example determination of a theme phrase Q for a response phrase $A_1$ in one embodiment.

In FIG. 7, the response phrase selection device 1000 acquires a theme group (set) P of positive example pairs and a theme group (set) N of negative example pairs for the response phrase $A_1$ from the ogiri DB 107*c* (step S10). Referring to FIG. 4, it can be seen that the theme group P of positive example pairs includes $Q_1$ and $Q_2$, and referring to FIG. 5, it can be seen that the theme group N of negative example pairs includes $Q_3$.

Next, the response phrase selection device 1000 calculates the feature value of each theme phrase ($Q_1$ and $Q_2$) of the group P and the feature value of each theme phrase ($Q_3$) of the group N. Here again, the response phrase selection device 1000 can calculate the feature value of the theme phrase from the cosine similarity. The feature values of the theme phrases $Q_1$ and $Q_2$ are set to $F_{q1}$ and $F_{q2}$, and the feature value of the theme phrase $Q_3$ is set to $F_{q3}$. Then, the response phrase selection device 1000 constructs a positive/negative example determination model by machine learning using a support vector machine with $F_{q1}$ and $F_{q2}$ respectively as a label 1 and $F_{q3}$ as a label −1 (step S11).

Next, the response phrase selection device 1000 inputs the feature value $F_q$ of the given theme phrase Q to the positive/negative example determination model (step S12), and determines whether the output label is 1 or −1 (step S13) If the output label is 1, the response phrase selection device 1000 determines that this is a positive example (step S14), and if the output label is −1, the response phrase selection device 1000 determines that this is a negative example (step S15).

The positive/negative example determination unit 104 determines positive/negative examples of the theme phrase Q with respect to all of the response phrases stored in the ogiri DB 107*c*. The response phrase score calculation unit 105 receives those determination results and extracts a set of response phrases (referred to as a response phrase group $A_p$) determined to be positive examples for the theme phrase Q. The response phrase score calculation unit 105 obtains a set of theme phrases (referred to as a theme phrase group $O_p$) that form a positive example pair for each response phrase that is an element of the response phrase group $A_p$. For example, if the theme phrase Q is determined as a positive example with respect to the response phrase $A_1$, then $Q_1$ and $Q_2$ correspond to the theme phrase group $O_p$ that forms a positive example pair for the response phrase $A_1$ (see FIG. 5).

Next, the response phrase score calculation unit 105 calculates the cosine similarity between the feature value $F_q$ of the theme phrase Q and the feature values $F_{q1}$ and $F_{q2}$ of the respective theme phrases $Q_1$ and $Q_2$ that are elements of the theme phrase group $O_p$, and sets the highest value as the score for the response phrase $A_1$ of the theme phrase Q. By the response phrase score calculation unit 105 performing this processing with respect to all of the response phrases that are the elements of the response phrase group $A_p$, response phrase score data for the theme phrase Q is created. The response phrase selection unit 106 selects a response phrase for the theme phrase Q based on the response phrase score data.

Figure 8:
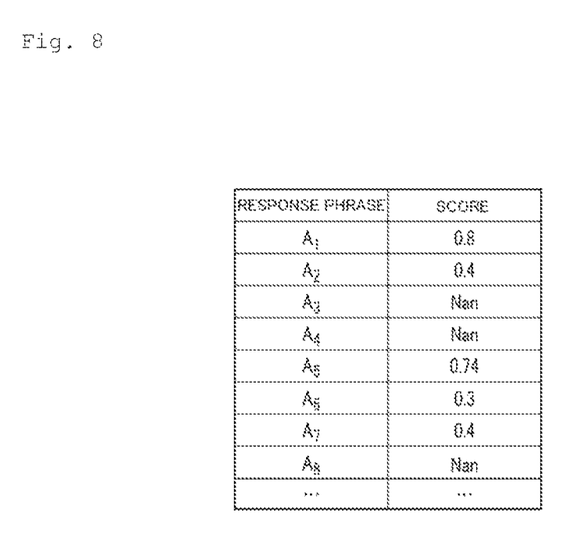
FIG. 8 is used to explain response phrase score data.

FIG. 8 is used to explain the response phrase score data. In FIG. 8, the score of the response phrase $A_1$ is 0.8, which is the highest score in the figure. That is, assuming reference to FIG. 8, the response phrase $A_1$ is selected for the theme phrase Q. Note that score calculation is not performed with respect to a response phrase determined to be a negative example. In FIG. 8, this is indicated by NaN (Not a Number), indicating lack of data.

Effects

As described above, in one embodiment, theme phrases and response phrases forming positive example pairs, and theme phrases and response phrases forming negative example pairs, are stored in the ogiri DB 107*c* in advance. Using a pair of a response phrase and a theme phrase that recalls laughter of a user as a positive example, and using a pair of a response phrase and a theme phrase that does not recall laughter of a user as a negative example, a positive example set P and a negative example set N of theme phrases for one certain response phrase A are calculated. Then, a positive/negative example determination model learned using the set P and the set N as teachers is constructed.

Further, in one embodiment, when the theme phrase Q is given, the feature value $F_q$ of that theme phrase Q is calculated from the cosine similarity with feature keywords stored in advance in a database. The feature value $F_q$ is applied to the positive/negative example determination model to perform a positive/negative example determination for a response phrase A. The cosine similarity is calculated between the theme phrase Q and a plurality of theme phrases that form a pair with a response phrase A determined to be a positive example, and the highest value is set as the score of the response phrase A. Then, the response phrase indicating the maximum score is selected and presented as the response phrase to the theme phrase Q.

By adopting such a configuration, in one embodiment, a predicate-argument structure database is not used, and it is not necessary to refer to a history of spoken phrases of a user, so it is possible to select a response phrase that causes laughter of the user for an unknown theme phrase. That is, according to the present invention, it is possible to select a response phrase appropriate for a theme phrase.

It should be noted that the present invention is not limited to the above embodiment. For example, in the flowchart of FIG. 7, the processing involved in constructing a positive/negative example determination model (steps S10 and S11) and the processing for determining a positive example or a negative example using this positive/negative example determination model (steps S12 to S15) do not need to be executed consecutively. For example, by repeating only the processing of steps S10 and S11, the learning of the positive/negative example determination model can be accumulated, and thus the accuracy of the determination in steps S12 to S15 can be expected to improve.

Also, it is possible to implement all or at least one functional block of the processor 100 in a cloud computing system. By entrusting the processing related to the selection of the response phrase to a cloud service, the load on the user-side device can be reduced, and thus a gadget such as an AI speaker, a smartphone application, or the like can be realized.

In addition, the functional configuration or the like of the response phrase selection device can be variously modified in a manner not departing from the gist of the invention.

It should be noted that the invention of the present application is not limited to the above-described embodiment, and can be variously modified in a manner not departing from the gist of the invention at an implementation stage. Also, respective embodiments may be appropriately combined as much as possible, and in this case, it is possible to obtain combined effects. Further, the above embodiments include inventions at various stages, and various inventions can be extracted by appropriately combining a plurality of the disclosed constituent elements.

REFERENCE SIGNS LIST

100 Processor
101 Theme phrase storage unit
102 Keyword extraction unit
103 Theme phrase feature value calculation unit
104 Positive/negative example determination unit
105 Response phrase score calculation unit
106 Response phrase selection unit
107 Storage unit
107*a* Program
107*b* Feature keyword database
107*c* Ogiri database
1000 Response phrase selection device
1001 Theme phrase input device
1002 Information presentation device

The invention claimed is:

1. A response phrase selection device, comprising:
   a processor; and
   a storage medium having computer program instructions stored thereon, when executed by the processor, perform:
   a theme database configured to store a theme phrase Qi, wherein the theme phrase Qi corresponds to a plurality of response phrases, wherein the theme phrase Qi and corresponding response phrases are text data;

training a positive/negative example determination model as a machine learning model based on datasets stored in the theme database having one or more theme phrases Qi along with corresponding response phrases for each theme phrase Qi, wherein each themed phase Qi is assigned with a label of a positive example or a negative example corresponding to a feature value with respect to all of the response phrases stored in the theme database, wherein the positive example includes a pair of a theme phrase and a response phrase that is intended to recall an audible stimulus from a user, and the negative example includes a pair of a theme phrase and a response phrase that does not recall an audible stimulus from the user;

using the positive/negative example determination model, performing a positive/negative example determination of a given theme phrase Q for each response phrase, wherein the given theme phase is a text data, wherein the positive/negative example determination is associated with a label indicating whether the theme phase Q for each response phrase is either a positive example or a negative example;

wherein the performing the positive/negative example determination of the given then phase Q includes:
  receiving an input of a given theme phrase Q to create a corresponding response phase;
  using a keyword extraction unit to obtain a word grouping by dividing the theme phrase Q into word units by a morphological analysis device; and
  calculating a feature value of the theme phrase Q using the word grouping and a plurality of feature keywords stored in feature keyword database, wherein the word grouping is an array in which each word of the theme phase Qi is converted to a vector, wherein the feature value is a 2m-dimensional vector; and
  determining whether the theme phase Q is a positive example or a negative example based on the feature value of the theme phase Q and the positive/negative example determination model;

calculating a response phrase score from the feature value of the theme phase Qi that is a positive example for a response phrase and the feature value of the given theme phrase Q for a response phrase determined to be a positive example by the positive/negative example determination model, wherein the response phrase score indicates a degree of conformity with the theme phase Q for each of the response phrases determined to be a positive example stored in the theme database; and
selecting a response phrase for the theme phrase Q based on the response phrase score.

2. The response phrase selection device according to claim 1, wherein the feature value of the theme Qi is calculated from a keyword vector of a word included in the theme Qi, and the feature value of the theme phrase Q is calculated from a keyword vector of a word included in theme phrase Q.

3. The response phrase selection device according to claim 2, wherein the computer program instructions further perform to calculate a cosine similarity from the feature value of the theme Qi and the feature value of the theme phrase Q, and sets a maximum value of the cosine similarity as the response phrase score.

4. A non-transitory computer-readable medium having computer-executable instructions that, upon execution of the instructions by a processor of a computer, cause the computer to function as the response phrase selection device according to claim 1.

5. The response phrase selection device according to claim 1, wherein the instructions further perform to:
  determine, using the positive/negative example determination model, whether the theme phase Q is a positive example or a negative example with respect to all of the response phrases stored in the theme database;
  calculating the response phrase score for the given theme phrase Q for each response phrase based on the feature value of the given theme phrase Q; and
  selecting the response phrase for the theme phrase Q associated the response phrase score that indicates a maximum score for the theme phase Q based on a plurality of response phrase scores calculated for the given theme phrase.

6. The response phrase selection device according to claim 1, wherein calculating the response phrase score based on a result of a positive example or a negative example for all of the response phases stored in the theme database for the theme phase Q based on the feature value of the theme response Q.

7. The response phrase selection device according to claim 1, wherein the positive/negative example determination model is constructed using at least one of a support vector machine or a natural language analysis.

8. The response phrase selection device according to claim 1, wherein the label for the positive example is a numerical value and the label of the negative example is a numerical value that is not the same as the numerical value for the positive example.

9. The response phrase selection device according to claim 1, wherein a theme phase includes a phrase that is spoken or written that corresponds to a category of performing arts.

10. A response phrase selection method executed by a response phrase selection device given a theme phrase, wherein the response phase selection device comprises a theme database configured to store a theme phrase Qi, wherein the theme phrase Qi corresponds to a plurality of response phrases, wherein the theme phrase Qi and corresponding response phrases are text data; the method comprising:
  training a positive/negative example determination model as a machine learning model based on datasets stored in the theme database having one or more theme phrases Qi along with corresponding response phrases for each theme phrase Qi, wherein each themed phase Qi is assigned with a text label of a positive example or a negative example corresponding to a feature value with respect to all of the response phrases stored in the theme database, wherein the positive example includes a pair of a theme phrase and a response phrase that is intended to recall an audible stimulus from a user, and the negative example includes a pair of a theme phrase and a response phrase that does not recall an audible stimulus from the user;
  using the positive/negative example determination model, performing a positive/negative example determination of a given theme phrase Q for each response phrase, wherein the positive/negative example determination model includes a machine learning model, wherein the given theme phase is a text data, wherein the positive/negative example determination is associated with a label indicating whether the theme phase Q for each response phrase is either a positive example or a negative example;

wherein the performing the positive/negative example determination of the given then phase Q includes:
  receiving an input of a given theme phrase Q to create a corresponding response phase;
  using a keyword extraction unit to obtain a word grouping by dividing the theme phrase Q into word units by a morphological analysis device; and
  calculating a feature value of the theme phrase Q using the word grouping and a plurality of feature keywords stored in feature keyword database, wherein the word grouping is an array in which each word of the theme phase Qi is converted to a vector, wherein the feature value is a 2m-dimensional vector; and
  determining whether the theme phase Q is a positive example or a negative example based on the feature value of the theme phase Q and the positive/negative example determination model;
calculating a response phrase score from the feature value of a theme phase Qi that is a positive example for a response phrase and the feature value of the theme phrase Q for the response phrase determined to be a positive example, wherein the response phrase score indicates a degree of conformity with the theme phase Q for each of the response phrases determined to be a positive example stored in the theme database; and
selecting a response phrase for the theme phrase Q based on the response phrase score.

\* \* \* \* \*